United States Patent
Rutyna et al.

(10) Patent No.: US 6,548,993 B1
(45) Date of Patent: Apr. 15, 2003

(54) POWER SUPPLY MODULE HAVING INTERNAL ENERGY STORAGE CIRCUIT FOR STABLE OSCILLATION

(75) Inventors: Cindy Marie Rutyna, Plymouth; Eve Ann Hadley, Novi; Peter Langer, Lexington, all of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/706,462

(22) Filed: Nov. 3, 2000

(51) Int. Cl.[7] .............................. G05F 1/40; G05F 1/44; G05F 1/56
(52) U.S. Cl. ..................... 323/288; 323/282; 323/284
(58) Field of Search ................................. 323/288, 282, 323/284, 285

(56) References Cited

U.S. PATENT DOCUMENTS

| | | | |
|---|---|---|---|
| 3,448,407 A | * | 6/1969 | Lankreijer ............... 331/167 |
| 4,001,725 A | * | 1/1977 | Rossnick ............... 331/117 R |
| 4,309,639 A | | 1/1982 | Thrower, Jr. et al. ......... 315/82 |
| 4,321,563 A | * | 3/1982 | Lesarte ................. 331/117 FE |
| 4,841,198 A | | 6/1989 | Wilhelm ..................... 315/82 |
| 4,845,465 A | | 7/1989 | Kruse et al. ............... 340/468 |
| 4,902,958 A | | 2/1990 | Cook, II ..................... 323/282 |
| 5,053,677 A | | 10/1991 | Sanner et al. ................... 315/77 |
| 5,182,503 A | | 1/1993 | Denneman et al. ......... 315/224 |
| 5,191,302 A | * | 3/1993 | Rossnick ..................... 331/109 |
| 5,293,077 A | | 3/1994 | Seki et al. ................. 307/10.8 |
| 5,404,094 A | | 4/1995 | Green et al. ................. 323/282 |
| 5,517,064 A | | 5/1996 | Murakami ................. 307/10.1 |
| RE35,428 E | | 1/1997 | Wilhelm ..................... 307/10.8 |
| 5,675,244 A | | 10/1997 | Piton |

FOREIGN PATENT DOCUMENTS

| | | | |
|---|---|---|---|
| GB | 2 059 693 | 4/1981 | |
| GB | B1 2 314 980 | 1/1998 | ............. H02P/7/28 |
| JP | 9-204230 | 8/1997 | |

* cited by examiner

Primary Examiner—Bao Q. Vu
(74) Attorney, Agent, or Firm—Brinks Hofer Gilson & Lione

(57) ABSTRACT

A power supply module has an internal energy storage circuit to reduce the number of external wire connections to the power supply module. The power supply module is used to provide pulsed electrical energy to a load. The power supply module includes a semiconductor switch, an oscillator, and an energy storage circuit. The energy storage circuit accumulates energy for providing electrical energy to the oscillator to maintain stable, active operation of the oscillator and to provide a control voltage for the semiconductor switch.

19 Claims, 4 Drawing Sheets

POWER SUPPLY MODULE HAVING INTERNAL ENERGY STORAGE CIRCUIT FOR STABLE OSCILLATION

FIELD OF THE INVENTION

This invention relates to a power supply module having an internal energy storage circuit.

BACKGROUND

The electrical power consumption of gas-powered and diesel-powered vehicles is expected to increase as more elaborate electrical features are introduced into vehicles. For example, a typical automobile may require an electrical system with a capacity of more than 3 kilowatts in the future. To meet increased peak power requirements, vehicle manufacturers may adopt higher voltage electrical systems than customary systems that support 12 volt batteries.

However, many electrical accessories, such as lamps, are designed to operate with a lower voltage source in the neighborhood of 12 volts direct current. Although a filament of a lamp may be lengthened or the wire gauge of the filament may be reduced to be compatible with a 36 volt or higher battery supply, longer or thinner filaments lack the durability of their lower voltage counterparts. Vehicle manufacturers may not want to make the tradeoff of lower reliability attendant with higher voltage lamps in the vehicular environment. Thus, a need exists for a power supply module that makes a higher voltage supply compatible with a lower voltage load.

Wiring harnesses are used throughout vehicles to provide power or control signals to circuitry or passive components distributed throughout the vehicle. Wiring harnesses are frequently pulled through or otherwise routed in cramped spaces internally within the vehicle. Wiring harnesses generally become more bulky, difficult to install, and expensive as the number of wires in the harness increase to support various electrical features. Thus, a need exists to reduce the complexity of wiring within the vehicle, while reaping the advantages of the aforementioned higher voltage electrical system.

SUMMARY OF THE INVENTION

In accordance with the invention, a power supply module has an internal energy storage circuit to reduce the number of external wire connections to the power supply module. The power supply module is used to provide pulsed electrical energy to a load. The power supply module includes a semiconductor switch, an oscillator, and an energy storage circuit. The semiconductor switch has a first state for placing electrical potential across terminals of a load at a supply voltage level and a second state for placing no electrical potential across the terminals. The oscillator alternately activates the semiconductor switch to achieve the first state for a first duration and the second state for a second duration. The oscillator is controlled to apply an average voltage (e.g., root mean squared voltage) of a lesser voltage level than the supply voltage level to the load. The energy storage circuit accumulates energy for providing electrical energy to the oscillator to maintain stable, active operation of the oscillator.

The power supply module of the invention supports a higher voltage electrical system that allows lower amperage components and wires to be used to supply the same peak power as a lower voltage system. A higher voltage electrical system may handle more electrical features or more power intensive electrical features for the same size of wiring within the vehicle. Alternatively, the cross-sectional size of the wiring may be decreased to provide the same capacity of electrical power as a lower voltage electrical system.

The power supply module of the invention includes as few as two external terminals (e.g., a load terminal and a ground terminal) for external electrical connection. Accordingly, the external packaging of the power supply module is relatively simple and may be composed of a dielectric with provisions for just two external conductors that are connected to the internal circuitry of the power supply module. The power supply module may be installed quickly and accurately because as few as one supply wire is required to feed the load terminal with an energy source. Where multiple power supply modules are used in a vehicle, an overall reduction in the number of requisite supply wires may lead to simplified wiring and reduced assembly time for the vehicle. Further, the elimination of some wires may reduce the space required for routing wiring harnesses through the vehicle and reduce the cost of a wiring harness.

DETAILED DESCRIPTION OF THE PREFERRED EMBODIMENTS

Figure 1:
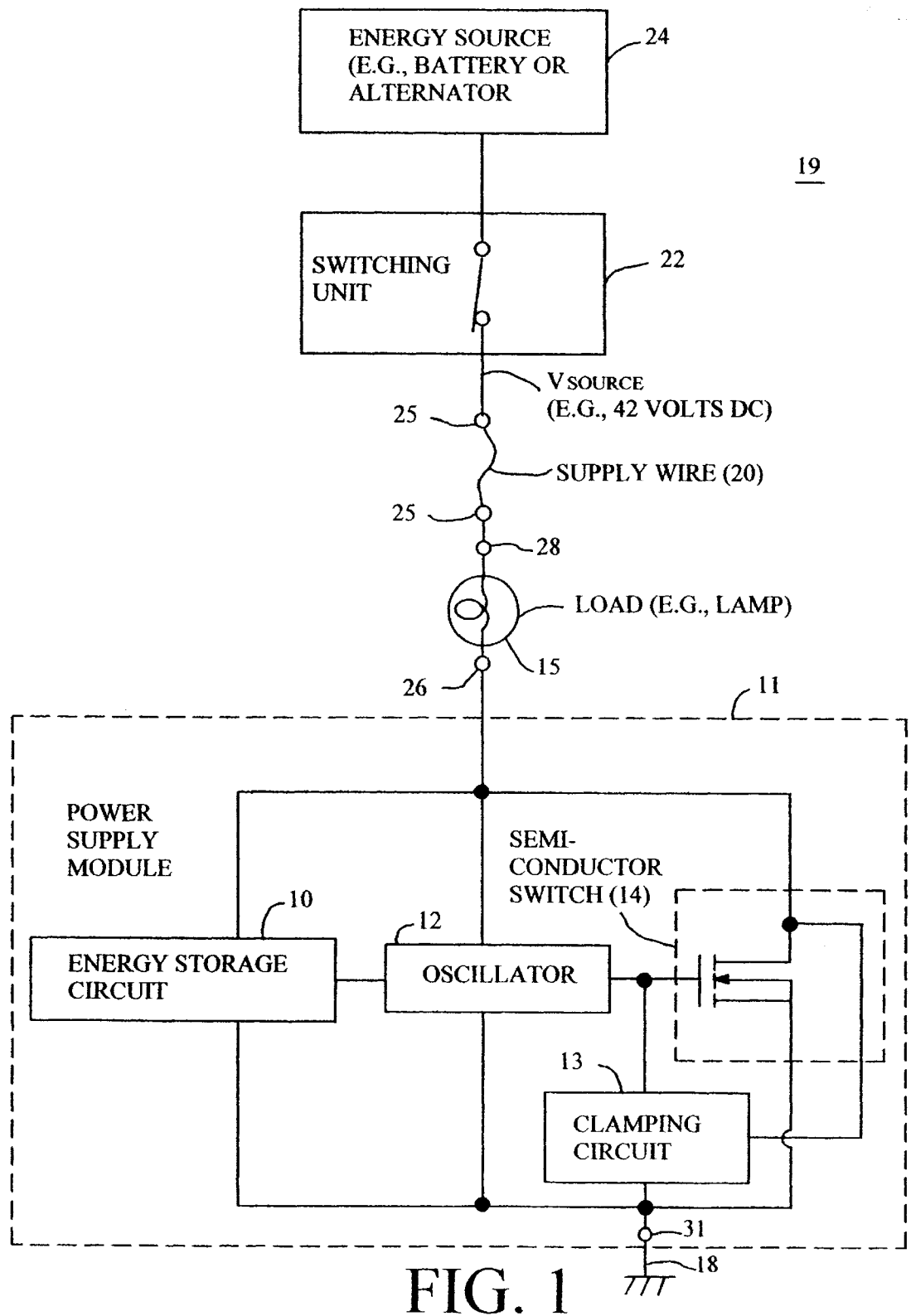
FIG. 1 is a block diagram of an electrical system including a power supply module in accordance with the invention.

FIG. 1 shows a block diagram of an electrical system 19 including a power supply module 11 in accordance with the invention. The electrical system 19 may represent an electrical circuit for a vehicle. The electrical system 19 includes an energy source 24 coupled to a switching unit 22. In turn, the switching unit 22 is coupled to one terminal 28 of a load 15 (e.g., a lamp) via a supply wire 20. The other terminal 26 of the load 15 is coupled to a power supply module 11.

The electrical system 19 includes a switching unit 22 coupled to the energy source 24 for energizing the load 15. The power supply module 11 controls the duration of the energizing of the load 15. The power supply module 11 is connected in an electrical path between the switching unit 22 and electrical ground 18. As few as a single supply wire 20 or conductor may be coupled between the load 15 and the switching unit 22 to facilitate the completion of the electrical circuit for the load 15. Because the voltage output of the energy source 24 exceeds a maximum continuous voltage rating of the load 15, the power supply module 11 may provide an intermittently switched connection to ground 18 to reduce the average voltage applied to the load 15 to a suitable level for the load 15.

The power supply module 11 provides a controllable electrical path to ground for the load 15. The power supply module 11 includes an energy storage circuit 10 coupled to an oscillator 12. In turn, the oscillator 12 drives a semiconductor switch 14 for controlling the application of a voltage to the load 15. A clamping circuit 13 is associated with the semiconductor switch 14 to prevent the load 15 from exposure to excessive current.

The energy source 24 may include a battery, an alternator, a generator, a voltage regulator, or any combination of the foregoing items. In one embodiment, the energy source 24 provides a higher voltage, direct current (DC) output within a range from approximately 25 volts to approximately 58 volts.

The switching unit 22 refers to a switch with at least one pole, a flashing unit, a stick-mounted switch, a floor-mounted switch, or any other device for providing a controllable electrical connection between at least two terminals. A flashing unit refers to a switching circuit that alternates the making and breaking of the electrical connection between two terminals to support a turn signal or hazard light of a vehicle, for example. The load 15 is coupled to the energy source 24 via a supply wire 20 and the switching unit 22. The supply wire 20 is rated for operation with the supply voltage level (e.g., 42 volts continuous duty) of the energy source 24 and the amperage drain of the load 15. The amperage rating of the supply wire 20 should be consistent with the amperage required for the corresponding operational voltage (e.g., approximately 14 volts average as formed by a square-wave with an approximately 42 volt peak voltage) of the load 15.

The load 15 has two terminals. In practice, the electrical system 19 may include a fuse (not shown) in series with the electrical path defined by the supply wire 20. One terminal 28 of the load 15 is coupled to the supply wire 20. The other terminal 26 of the load 15 is coupled to the power supply module 11. The supply wire 20 has two terminating ends 25, which may have spade lugs, connectors, or another mechanism for forming a reliable electrical and mechanical connection.

In one embodiment, the load 15 refers to a lamp. A lamp has two terminals (e.g., 26, 28) for application of electrical energy. The electrical energy for application to the load 15 is preferably a square-wave signal with a low duty cycle or another waveform (e.g., pulsed direct current signal) with a suitable average voltage output (e.g., root-mean-squared voltage (RMSV)) for the load 15. The switching unit 22 controls the operation of the load or lamp. For example, the switching unit 22 determines whether the lamp is continuously on, intermittently on, or completely off.

In another embodiment, the load 15 represents an incandescent lamp, such as a halogen lamp that is designed to operate on from a voltage source of approximately 12.8 volts. Incandescent lamps are not generally designed to work directly from 42 volts direct current because the filaments for such lamps may be too thin and fragile for reliable operation.

The power supply module 11 is connected to electrical ground 18 and the load 15. The power supply module 11 provides an electrical path to ground 18 at a low duty cycle so as to make the load 15 dissipate energy at the rate it would if it was connected to a lower voltage level (e.g., 14 volts) than the supply voltage level (e.g., 42 volts).

An energy storage circuit 10 captures and stores energy while the semiconductor switch 14 is turned off or inactive. The oscillator 12 develops an input signal with a duty cycle to turn the semiconductor switch 14 on or off to achieve a reduction in the average voltage or root mean-squared voltage (RMSV) applied across the terminals of the load 15. The oscillator 12 may be a square-wave oscillator, for example. The oscillator 12 may produce a low duty-cycle square wave with rounded edges and a slow rise time or another suitable pulse train.

The semiconductor switch 14 provides an electrical path to ground 18 for the load 15 when the load 15 is turned on and provides a high resistance to ground 18 when it is turned off. The power supply module 11 may supply a controllable electrical path that conducts current to ground 18 in accordance with pulse width modulation (PWM) or another pulsed energy scheme. In practice, one power supply module 11 may be used per load 15 of a vehicle.

Figure 2:
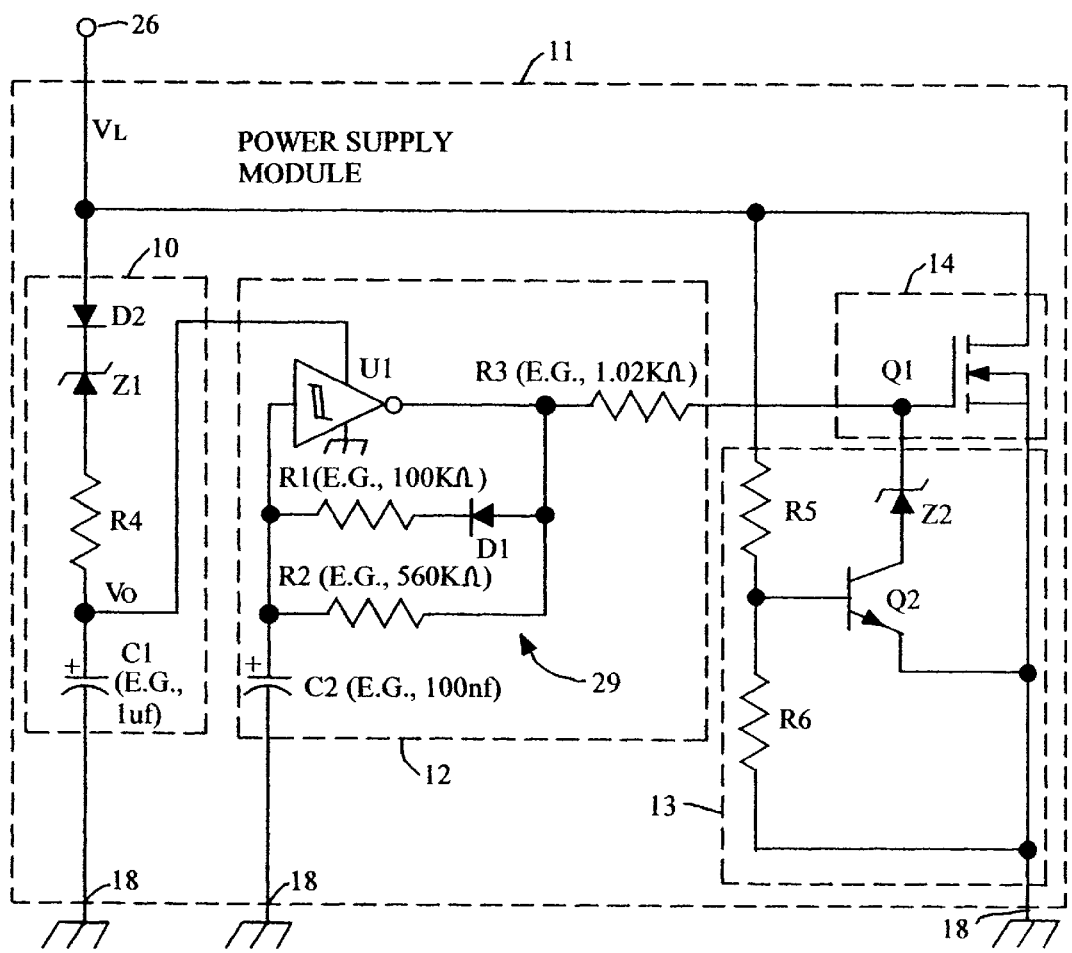
FIG. 2 is a schematic diagram of possible components for implementing the block diagram of FIG. 1 in accordance with the invention.

FIG. 2 shows an illustrative example of possible components that may be used to implement the power supply module 11 of the block diagram of FIG. 1. Like elements in FIG. 1 and FIG. 2 are indicated by like reference numbers.

As shown in FIG. 2, the energy storage circuit 10 includes a blocking diode D2, a zener diode Z1, and an electrolytic capacitor C1. The blocking diode D2 allows current to flow into the energy storage circuit 10 to charge the electrolytic capacitor C1. Current flows into the energy storage circuit 10 when the semiconductor device Q1 is in the off or inactive state because the voltage drop across the load 15 is minimal.

However, when the semiconductor device Q1 is on or active, the voltage drop across the load 15 is maximized and no voltage is available to charge the electrolytic capacitor C1. The blocking diode D2 prevents the capacitor C1 from being drained or discharged by a component other than the oscillator 12 when semiconductor device Q1 is turned on. That is, the blocking diode D2 blocks the path of current from the capacitor C1 through the semiconductor device Q1 to ground 18 and also through the resistors R5 and R6 to the ground 18.

The zener diode Z1 reduces the voltage $V_L$ (e.g., 42 VDC) that is applied to resistor R4 by a fixed amount. If the positive voltage on the cathode of the zener diode Z1 exceeds a breakdown voltage or zener voltage of the junction, the zener diode Z1 conducts current in the reverse direction from the cathode to the anode. Zener diodes are commercially available with breakdown voltages within a range from 2 volts to 45 volts, for example. The reverse bias on the zener diode Z1 is adjusted by selecting an appropriate resistance for biasing resistor R4. Resistor R4 has a value selected to place the zener diode response into the constant voltage knee of its characteristic current versus voltage curve in the reverse bias mode.

In an alternate embodiment, the zener diode Z1 may be replaced by a voltage regulator, such as a series pass voltage regulator. A series pass voltage regulator may have an input terminal, an output terminal, and a control terminal that determines the level of voltage difference from the input terminal to the output terminal. The voltage regulator may be able to compensate for a lower input voltage than desired at the input terminal, while maintaining a uniform output voltage at the output terminal.

The energy storage circuit 10 outputs an output voltage level suitable for application to a power input terminal of the oscillator 12. In one embodiment, the oscillator 12 includes an inverter (e.g., inverter Ui in FIG. 2). The inverter may comprise a complementary metal oxide semiconductor (CMOS). In another embodiment, the inverter may comprise a transistor-transistor logic (TTL) device or a transistor-to-transistor low power Schottky (TTL-LS) device. Accordingly, the TTL inverter may accept the input of an output voltage of 5 volts from the energy storage circuit 10.

If the internal resistance of the electrolytic capacitor C1 is ignored or negligible, the output voltage level (Vo) at the capacitor C1 is the load terminal voltage ($V_L$) less the forward voltage drop ($V_{D2}$) of the blocking diode D2, the zener voltage ($V_{Z1}$) of the zener diode Z1, and the voltage drop ($V_{R4}$) through the biasing resistor R4. That is, the following mathematical expression applies: $Vo=V_L-V_{D2}-V_{Z1}-V_{R4}$. $V_{R4}$ may equal zero volts when capacitor C1 is fully charged. $V_{R4}$ depends upon the charging current at other times, when the capacitor C1 is not fully charged.

The electrolytic capacitor C1 stores the output voltage level (Vo) for application to the power supply terminal of the oscillator 12. The output voltage level represents a direct current signal. If the value of the electrolytic capacitor C1 is large enough, the capacitor C1 may smooth ripple or fluctuation from any alternating current noise in the direct current signal outputted to the oscillator 12.

The oscillator 12 may refer to an inverter with hysteresis. In an alternate embodiment, the oscillator 12 may comprise an amplifier with hysteresis, an operational amplifier with hysteresis, or a comparator with hysteresis. The oscillator 12 provides a square-wave output or another suitable waveform for turning on semiconductor device Q1 for a first duration and turning off semiconductor device Q1 for a second duration. For a square-wave output, the oscillator 12 output has a high logic level during the first duration and a low logic level during the second duration. In one embodiment, the first duration is generally equal to ten percent of the total period and the second duration is generally equal to ninety percent. The inverse of the sum of the first duration and the second duration equals the frequency of oscillation.

The oscillator 12 has a feedback section 29, which includes a feedback capacitor C2, feedback resistors R1 and R2, and blocking diode D1. The feedback section 29 feeds the oscillator 12 output back into the oscillator input in accordance with a time constant that establishes the first duration and the second duration of the semiconductor device Q1. The oscillator 12 outputs an alternating current output waveform with an average voltage or root mean-squared output voltage (e.g., 13.4 volts) across the load 15. The average voltage or root mean-squared output voltage is at a desired lower voltage level based on a higher supply voltage level (e.g., 42 volts). The oscillator 12 determines the desired degree of reduction of the higher supply voltage level to the lower desired root mean-square voltage level by adjusting one or more of the following items: (1) a time constant of the feedback section 29 determined by the values of the feedback resistors (R1, R2), a feedback capacitor (C2), or both; (2) the oscillation frequency of the oscillator; (3) the first duration, the second duration of the semiconductor device Q1, or both.

The blocking diode D1 provides a non-symmetrical output for the oscillator by allowing for capacitor C2 to charge through resistors R1 and R2, but only to discharge through resistor R2, as shown in FIG. 2.

In one embodiment, the oscillator 12 comprises a Schmidt-triggered inverter U1. A Schmidt-triggered inverter U1 has a hysteresis characteristic. The hysteresis characteristic means that the voltage output of the Schmidt-triggered inverter U1 depends both upon the input voltage to the inverter U1 and a recent history of the output voltage. The parallel combination of the feedback resistors (R1 and R2) provide the requisite feedback on the output voltage to charge capacitor C2 and support the hysteresis. The Schmidt-triggered inverter U1 provides an output with hysteresis for the start and maintenance of oscillation of the oscillator 12. Without the hysteresis, the oscillator 12 would not oscillate.

The semiconductor switch 14 may refer to a semiconductor device Q1 or a power transistor, such as a metal oxide semiconductor field effect transistor (MOSFET). The semiconductor switch 14 may be configured to turn on when a leading edge of a logic high level of a square-wave output signal from the oscillator 12 is provided to a triggering input (e.g., gate or base) of the semiconductor switch 14. The semiconductor switch 14 is turned off after a trailing edge of the square-wave output. At a trailing edge of the square-wave output the pulse drops from the logic high to a logic low level.

In one embodiment, the semiconductor switch 14 may refer to a power field-effect transistor or another semiconductor device Q1 with a gate, a source, and a drain. When the semiconductor device Q1 is active, the semiconductor device Q1 conducts electrical current and provides a conductive path in the channel between the source and the drain. When the semiconductor device Q1 is inactive, the semiconductor device Q1 does not conduct to provide a conductive path in the channel between the source and the drain.

As shown in FIG. 2, the cathode of the zener diode Z2 is coupled to the gate of semiconductor device Q1, while the anode is coupled to transistor Q2. The clamping zener diode Z2 prevents reverse breakdown conduction of the gate-to-drain junction of the semiconductor device Q1 or an analogous base-to-emitter junction which might otherwise distort the output of the semiconductor switch 14 if large input swings are present at the triggering input (e.g., gate or base). For example, the clamping circuit 13 may limit the gate-to-drain voltage drop to a desired clamping voltage (e.g., approximately 4.9 volts).

Zener diode Z2, transistor Q2, resistor R5, and resistor R6 form a circuit that clamps the gate drive to Q1 to the desired clamping voltage (e.g., approximately 4.9 volts) when the drain-to-source voltage of semiconductor device Q1 exceeds a specified value. The specified value is determined by the voltage divider formed by resistor R5 and R6, which is placed across the drain-source path of the semiconductor device Q1. The clamping voltage is selected by the reverse breakdown voltage of the zener diode Z2 which is connected to ground by transistor Q2.

The biasing resistors R5 and R6 bias the clamping transistor Q2 which introduces or removes the clamping zener diode Z2 from active participation in the clamping circuit 13 to provide a soft-start and limit the in-rush current for semiconductor device Q1. If the drain-to-source voltage of semiconductor device Q1 is less than a specified amount as set by resistor R5, resistor R6, and the base emitter voltage drop (Vbe) of transistor Q2, the clamping transistor Q2 is switched off when the semiconductor device Q1 is on (e.g., operating in the fully enhanced mode). The clamping transistor Q2 is switched on when the semiconductor device Q1 is off because sufficient current flows through the series path of bias resistor R5 and biasing resistor R6 to ground 18. The voltage is inputted into the triggering input (e.g., base) of clamping semiconductor device Q1 via the voltage divider formed by resistors R5 and R6.

The resistor R3 is coupled between the output of the oscillator 12 and the input of the triggering input (e.g., gate) of the semiconductor switch 14. The resistor R3 limits the current into zener diode Z2.

Although any suitable values for the components of FIG. 2 may be used, in one embodiment the following values are used: R1 may be 100 KΩ (kilo-ohms) with a preferential tolerance of 5 percent, R2 may be 560 KΩ with a preferential tolerance of 5 percent; R3 may be 1.02 KΩ with a preferential tolerance of 1 percent; C1 may be 1 µF (micro-Farad) with a preferential tolerance of 20 percent; C2 may be 100 nF (nano-Farads) with a preferential tolerance of 10 percent; and zener diode Z2 has a zener voltage of approximately 4.7 volts.

Figure 3:
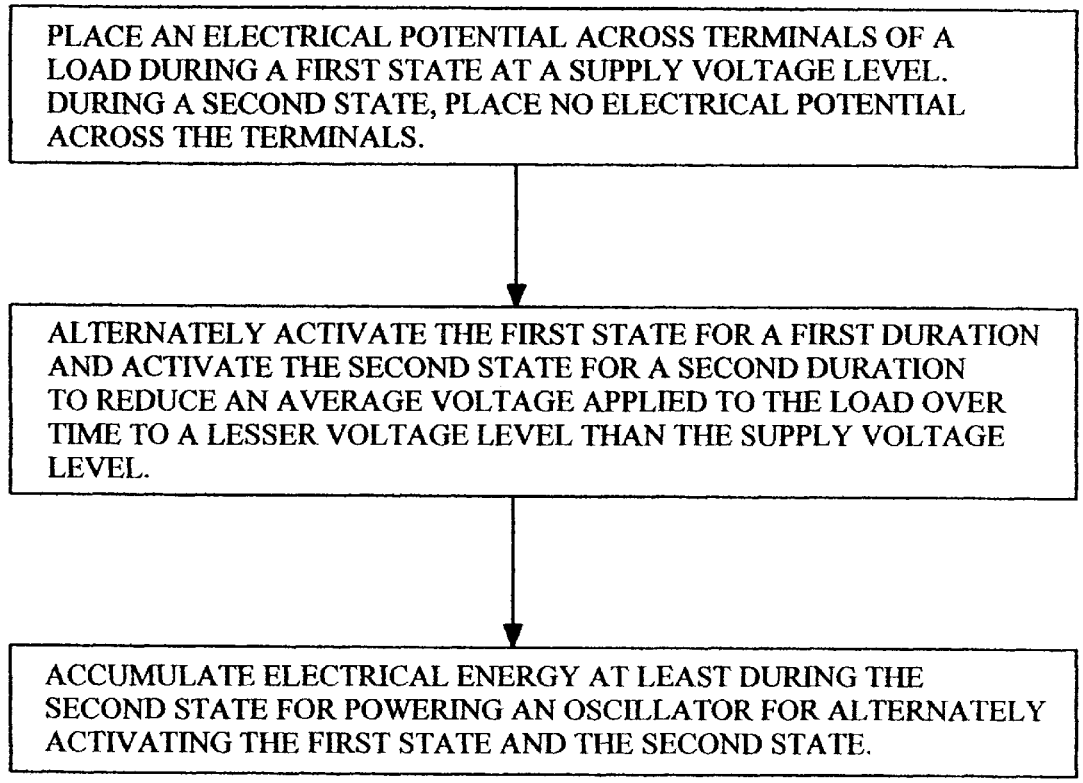
FIG. 3 is a flow chart of a method for providing electrical energy to a load in accordance with the invention.

FIG. 3 shows a flow chart of a method for providing electrical energy to a load (e.g., load 15) in accordance with the invention. The method includes the following series of steps, in which the following terms have identical meanings to the previous terms used in the description of FIG. 1 and FIG. 2. The method of FIG. 3 starts in step S10.

In step S10, the power supply module 11 provides a switch 14 for placing an electrical potential across terminals (26, 28) of the load 15 during a first state at a supply voltage level. Further, during a second state, the provided switch 14 places no electrical potential across the terminals (26, 28).

In step S12, the oscillator 12 of the power supply module 11 alternately activates the first state for a first duration and activates the second state for a second duration to reduce an average voltage applied to the load 15 over time to a lesser voltage level than the supply voltage level.

In step S14, the energy storage circuit 10 or the power supply module 11 accumulates electrical energy at least during the second state for powering an oscillator 12 for alternately activating the first state and the second state. For example, a capacitor of the energy storage circuit may store the electrical energy at least during the second state. In addition, the energy storage circuit 10 may maintain a desired maximum voltage level of a direct current voltage for application to the oscillator 12.

The method may further include the economical manner in which electrical connections for the load 15 are made to ground 18 and the energy source 24 with a minimal number of conductors. In one example, one of the terminals (28) of the load 15 is connected to the energy source 24 via a single supply wire 20 or conductor. Further, the other terminal 26 of the load 15 is connected to ground 18 via an intermittently switched connection to ground 18, wherein the intermittence is defined by the first duration and the second duration of the oscillator 12. The method of FIG. 3 may be supplemented or further defined by the remainder of this specification, including the description of FIG. 1, FIG. 2, and FIG. 4.

Figure 4:
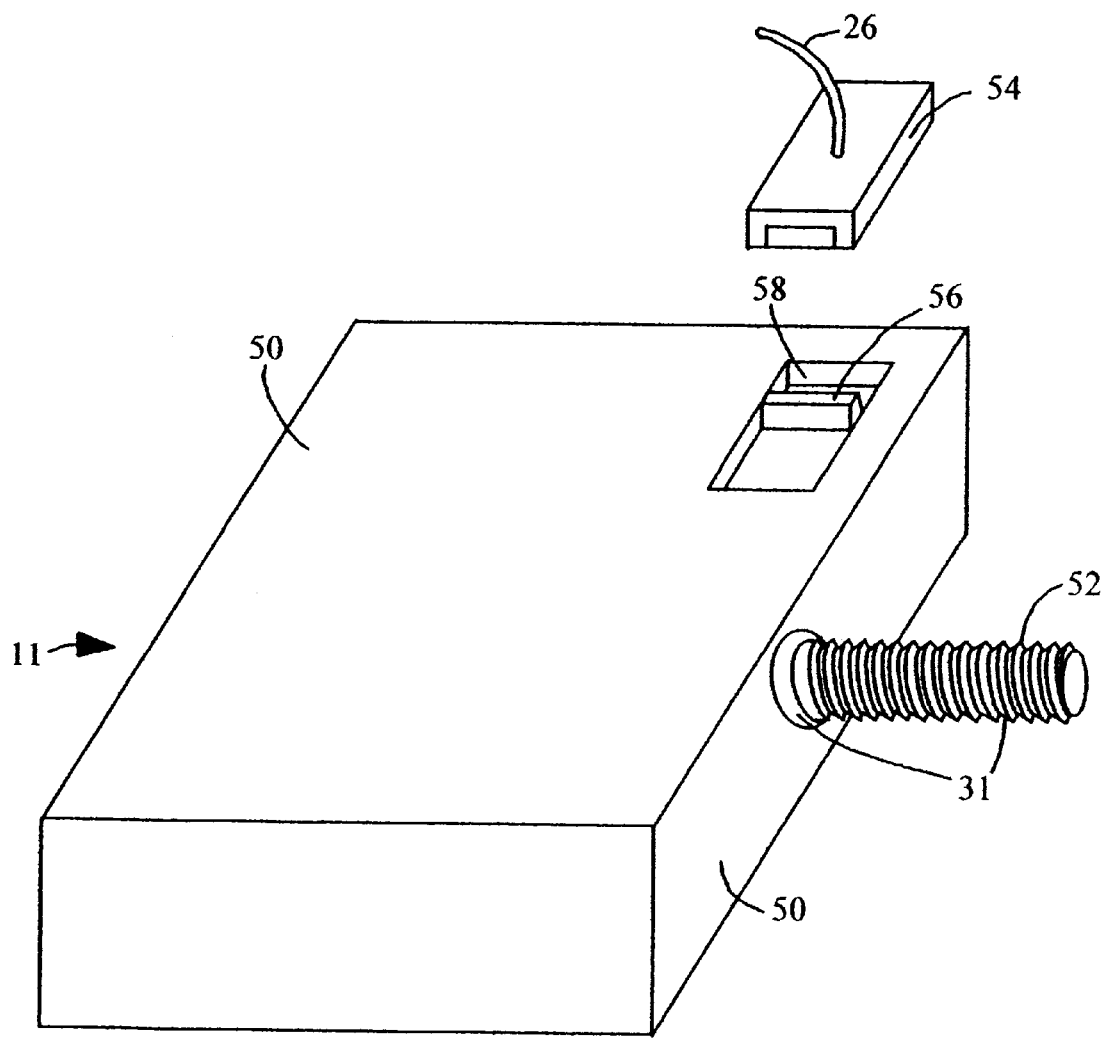
FIG. 4 is a perspective view of an illustrative embodiment of an exterior housing of the power supply module of FIG. 1.

As illustrated in FIG. 1 and FIG.4, the power supply module 11 provides as few as two external output terminals (26, 31) for electrical connection to at least a portion of an electrical system 19 of a vehicle. The two external output terminals include a load terminal 26 and a ground terminal 31. The load terminal 26 may be coupled to a supply wire 20 via the load 15 and the ground terminal 31 may be electrically connected to the chassis, a frame, an engine block, a ground bus, or another source of an electrical ground 18.

The ground terminal 31 and the load terminal 26 are associated with the housing 50 or packaging of the power supply module 11. The ground terminal 31 may be an integral mechanical mounting provision 52 (e.g., metallic threaded stud, a lug, or a metallic receptacle) for securing the power supply module 11 to a ground 18 of the vehicle. The integral mechanical mounting provision 52 serves as the dual purpose of mounting the power supply module 11 and providing an electrical connection to ground 18.

The load terminal 26 terminates in a connector 54 that supports a conductor (not shown). The conductor of the connector 54 is arranged to make electrical contact with a mating conductor 56 in a recess 58 within the housing 50. The conductor and the mating conductor 54 may refer to the combination of a plug and a jack or some other mechanical configuration that provides a reliable electrical connection. The recess 58 and a dielectric exterior of the connector 54 preferably have interlocking shapes and may feature a removable snap-fit connection for removably securing the connection of the connector 54 to the power supply module 11.

Accordingly, the power supply module 11 eliminates any requirement for a separate power supply line for powering the oscillator 12. Further, the clamping circuit 13 and the semiconductor switch 14 are powered via potential difference between the supply terminal 26 and the ground terminal 31, obviating additional wires for supplying power to the power supply module 11. Thus, the expense and assembly time of a wiring a vehicle having a higher voltage electrical system 19 than a traditional 12 volt system (i.e., battery voltage level) may be reduced. The power supply module of the invention may be co-located with a head-light assembly, a tail-light assembly, or the like of a vehicle.

In a vehicle, a single 42 volt power supply can be used to power direct current lamps or other light bulbs rated from approximately 12 volts to 18 volts. Accordingly, a vehicle may not require the complexity and cost of a dual voltage electrical system with a lower voltage bus (e.g., 14 volts direct current) and a separate higher voltage bus (42 volts direct current) for powering the load 15.

The power supply module of the invention may facilitate the use of thinner windings for an alternator to support a higher voltage electrical system, as opposed to a lower voltage electrical system, that supplies the same total peak power. Accordingly, an alternator for operation with a 36 volt battery may offer lower cost or increased power handling capacity in comparison to an alternator for a comparable 12 volt battery.

The foregoing description of the method and system for developing an electronic course provides several illustrative examples of the invention. Modifications, alternative arrangements, and variations of these illustrative examples are possible and may fall within the scope of the invention. Accordingly, the following claims should be accorded the reasonably broadest interpretation, which is consistent with the specification disclosed herein and not unduly limited by aspects of the preferred embodiments disclosed herein.

We claim the following:

1. A power supply module for providing electrical energy to a load, the power supply module comprising:
    a switch having a first state for placing an electrical potential across terminals of the load at a supply voltage level and a second state for placing no electrical potential across the terminals;
    an oscillator for alternately activating the first state for a first duration and activating the second state for a second duration to reduce an average voltage applied to the load over time to a lesser voltage level than the supply voltage level; and
    an energy storage circuit for accumulating electrical energy at least during the second state for powering the oscillator, the energy storage circuit comprising a blocking diode for preventing the flow of the accumulated electrical energy to the switch.

2. The power supply module according to claim 1 wherein the energy storage circuit further comprises:
    a voltage regulator for maintaining a desired maximum voltage level of a direct current voltage for application to the oscillator; and
    a capacitor coupled to the voltage regulator to store the electrical energy at least during the second state.

3. The power supply module according to claim 1 wherein the energy storage circuit comprises:
    the blocking diode for preventing a flow of current from the energy storage circuit through the switch;
    a zener diode for maintaining a desired maximum voltage level of a direct current voltage; and an electrolytic capacitor coupled in series with the zener diode to store the electrical energy at least during the second state.

4. The power supply module according to claim 1 further comprising:

a supply terminal associated with a common electrical connection between the energy storage circuit and the switch;

an energy source; and a single wire interconnecting the energy source and the supply terminal.

5. The power supply module according to claim 1 wherein the first state applies a ground potential to a terminal of the load to achieve the voltage potential across the terminals.

6. The power supply module according to claim 1 further comprising a clamping circuit limiting a voltage difference between a gate and a drain of the switch.

7. The power supply module according to claim 1 wherein the switch has a gate, a source and a drain; and further comprising:

a voltage regulating diode having a cathode coupled to the gate of the switch;

a transistor coupled to an anode of the voltage regulating diode and providing a switched connection of the cathode to ground if an input voltage to the transistor exceeds a threshold voltage based on the drain to source voltage across the switch.

8. The power supply module according to claim 1 wherein the switch is a power metal oxide semiconductor field effect transistor.

9. The power supply module according to claim 1 wherein the supply voltage level is approximately 42 volts and wherein the lower voltage level is less than approximately 12.8 volts.

10. The power supply module according to claim 1 wherein the oscillator comprises a duty cycle generator.

11. The power supply module according to claim 1 wherein the load comprises a lamp.

12. The power supply module according to claim 1 further comprising a ground terminal associated with the switch, the ground terminal providing a mechanical mounting provision for securing the power supply module to a vehicle and an electrical connection to an electrical ground of the vehicle.

13. An electrical circuit for a vehicle, the electrical circuit comprising:

an energy source;

a load;

a switching unit coupled to the energy source for energizing the load;

a power supply module for controlling the duration of the energizing of the load and connected in an electrical path between the switching unit and electrical ground, the power supply module comprising an energy storage circuit for storing electrical energy and a switch for energizing the load, the energy storage circuit having a blocking diode for preventing the flow of stored electrical energy to the switch; and a single wire coupled between the load and the switching unit to complete the electrical circuit for the load.

14. The electrical circuit according to claim 13 wherein the load comprises a lamp.

15. The electrical circuit according to claim 13 wherein the power supply module provides an intermittently switched connection to ground to reduce the average voltage applied to the load to a suitable level for the load.

16. The electrical circuit according to claim 13 wherein the power supply module has an integral mechanical mounting provision for securing the power supply module to the vehicle and providing an electrical ground connection to the power supply module via the mechanical mounting provision.

17. A method for providing electrical energy to a load, the method comprising the steps of:

placing an electrical potential across terminals of the load during a first state at a supply voltage level and, during a second state, placing no electrical potential across the terminals;

alternately activating the first state of a switch for a first duration and activating the second state of the switch for a second duration to reduce an average voltage applied to the load over time to a lesser voltage level than the supply voltage level; and accumulating electrical energy in an energy storage circuit at least during the second state for powering an oscillator for alternately activating the first state and the second state and preventing the flow of the accumulated electrical energy from the energy storage circuit to the switch.

18. The method according to claim 17 further comprising the steps of:

maintaining a desired maximum voltage level of a direct current voltage for application to the oscillator; and storing the electrical energy in a capacitor at least during the second state.

19. The method according to claim 17 further comprising the step of:

connecting one of the terminals of the load to an energy source via a single wire; and connecting another of the terminals of the load to via an intermittently switched connection to ground, wherein the intermittence is defined by the first duration and the second duration.

* * * * *